Jan. 28, 1964   F. VERES   3,119,717
ELECTRICALLY CONDUCTIVE SILICATE CERAMICS
AND METHOD OF MAKING THE SAME
Filed Nov. 9, 1959

INVENTOR.
FRANK VERES
BY
ATTORNEYS 3,119,717
ELECTRICALLY CONDUCTIVE SILICATE CERAMICS AND METHOD OF MAKING THE SAME
Frank Veres, Toledo, Ohio, assignor to Owens-Illinois Glass Company, a corporation of Ohio
Filed Nov. 9, 1959, Ser. No. 851,495
19 Claims. (Cl. 117—221)

This invention relates to articles of silicate ceramics which have limited electrical conductivity and to the method of making the same.

It is known in the art that by a process designated as iridizing, glass and other vitreous ceramic articles can be heated and contacted with certain metallic salts, such as those of tin and iron, whereby an iridescent layer of oxide is formed on the glass which renders the glass electrically conductive. Depending upon the oxides employed, the electrical resistivity of these coatings may be made either low—as illustrated by U.S. Patent 2,564,706—or high as to be practically non-conducting as evidenced by U.S. Patent 2,118,795.

One of the objects of this invention is to produce articles of silicate ceramics which have relatively high electrical resistivities and consequently relatively low electrical conductivities on preselected areas of their surfaces thereby permitting the use of the aforementioned articles as insulators which are free of radio-noise and corona formation.

More specifically an object of this invention is to produce areas of limited electrical conductivity on silicate ceramic articles wherein the conductivity is not only attributable to a conductive film on the surface of the article but also to conductivity which extends into the volume of the article part way.

Another object of this invention is to provide methods for the preparation of silicate ceramic articles having over parts of their surfaces a degree of conductivity which is less than the metallic coated ceramic articles known in the art but which is more conductive than the ceramic articles per se.

A further object is to produce chemically and thermally stable insulators of limited electrical conductivity.

A still further object is to produce nonpolarizable conductive coatings on insulators having limited electrical conductivity.

Other objects will be evident from the description which follows.

The new silicate ceramic articles of this invention are produced by any one of the following three methods: (1) exposing the surface of silicate ceramic articles to certain molten metals such as aluminum and magnesium; (2) coating said articles with certain powdered metals in an oxygen free atmosphere and heating to a temperature of 700° to 950° F. for several hours; and (3) reacting molten and fluid silicate glass with molten aluminum metal at high temperatures. In all three instances the ceramic turns dark due to the formation of grayish-black particles in the ceramic article which apparently result from the diffusion of the powdered metal into the ceramic article whereby the silica (or silicate) therein is (1) reduced to silicon metal or (2) combines with the metal to form a silicide, either of which imparts electrical conductivity to the ceramic article.

Reference is made to the following drawings for representative embodiments of the present invention.

The present invention will be more completely understood by reference to the following examples. In each instance all parts and percentages are by weight unless otherwise specified.

Example I

Figure 1:
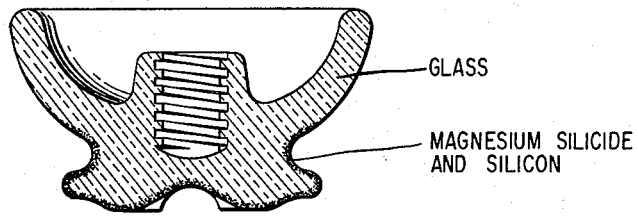
FIG. 1 is a cross-sectional view of a glass insulator having a conductive portion made in accordance with the present invention.

A pin type insulator made of soda lime glass was selectively coated with 60 mesh reagent quality magnesium powder and heated to 900° F. in a furnace for two hours under two inches of helium pressure. A light reflecting black film was formed on the surface of the insulator where exposed to the magnesium powder indicating chemical action by the magnesium. The insulator was sawed in half and it was noted that the black color extended to some depth below the surface of the insulator. The surface film was electrically conductive (see FIG. 1).

Example II

Figure 2:
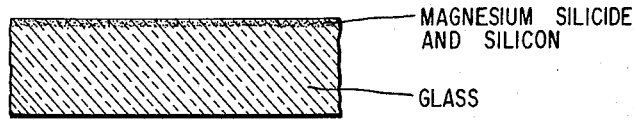
FIG. 2 is a cross-sectional view of glass plate made conductive by the present invention.

A sample of plate glass $7/16''$ wide by $1''$ long was coated with 80 mesh reagent quality magnesium powder and heated under the same conditions as set forth above with Example I and with the same results (see FIG. 2).

Example III

The procedure of Example II was repeated with substantially the same results except the metal was calcium.

Example IV

The procedure of Example II was repeated with the same results except the heating was done overnight.

Example V

Five pounds of glass consisting of

| | Percent |
|---|---|
| $SiO_2$ | 75 |
| $Na_2O$ | 25 | by weight were heated in a ceramic crucible to a temperature of 2300° F. in a gas fired furnace. The furnace atmosphere was set to have 1% excess air. At the temperature of 2300° F. the glass was in a very liquid condition. To the liquid glass there were added five one-pound pieces of aluminum which melted therein. The mixture was held at 2300° F. for two hours. Overnight, for a period of ten hours, the melt was allowed to cool to 1900° F. The object was to maintain the fluid aluminum in contact with the fluid glass over an extended period of time at a temperature at which the aluminum would not oxidize excessively. On cooling it was observed that the aluminum had floated to the top of the glass. The glass, which in its normal unreacted state was transparent and colorless, was as a result of this treatment opaque and black. A one-inch cube sample was sawed out of the glass. This sample was found to be electrically conductive.

Example VI

The procedure of Example V was repeated. For testing, a sample in the form of a rectangular solid, .825 cm. x .825 cm. x 1.232 cm. was sawed out of the reacted glass. The resistivity of the sample was determined to be $2.95 \times 10^3$ ohm centimeters at room temperature. In addition, it was also observed that this conductive sample was non-polarizable, i.e., the resistance of the sample did not change during the continued application of direct current. A glass of this type with a high resistivity and a resulting small degree of conductivity is useful for high tension insulators to overcome the corona effect. In addition a glass of this type has particular application for radio noise free insulators in which a surface resistance of 1 to 5 megohm per square centimeter is desired.

Example VII

The head of a pin type of insulator made of soda lime glass was exposed to molten aluminum at a temperature above the annealing point of the glass but below its softening temperature for a period of two hours. After removing the insulator from the metal bath and cooling to room temperature it was observed that a black conductive film had developed upon the surface that had been immersed in the molten metal. Furthermore, the black color extended to some depth into the insulator. The surface was found to have a conductivity of 4 megohms per square. It was observed that the insulator surface had the highest conductivity and that the conductivity tapered off gradually below the surface of the insulator. This gradual diminishing of conductivity is of extreme importance because it is known that a sharp demarcation between conductive and non-conductive areas on a high tension insulator tends to concentrate electrical stress and, therefore, is conducive to arcing.

*Example VIII*

A porous zircon ceramic body and a vitreous fused silica body were coated with powdered magnesium and heated to 900° F. for two hours in a helium atmosphere. In both cases a shiny black electrically conductive coating formed on the surfaces of the bodies.

The above examples are by way of illustration only, and various modifications may be employed without departing from the spirit and scope of the invention.

It will be apparent to one skilled in the art that inert gases other than nitrogen and helium may be used in the process, such as argon and neon, or that the reaction may be carried out under equivalent conditions such as in a vacuum.

In addition metals other than magnesium, calcium and aluminum such as thorium, cerium, and zirconium may be employed as the reactant which releases the silicon atoms from its oxygen bonds in the glass to combine with the silicon to form a silicide. The preferred metals are magnesium, barium, strontium, beryllium, and calcium.

By controlling the duration and intensity of the heating of the ceramic article within the range of 700–950° F., the degree of resistivity of the article may be varied from one to five megohms per square centimeter. When working with a formed glass article such as in Example I above, the maximum temperature is preferably below that at which the glass begins to flow and lose its shape. In general the higher the temperature employed, the greater the formation of the conductive silicon and silicide particles and consequently a lower resistivity. Although the normal heating period is about three hours, periods extending from one to twelve hours may be employed.

It will be apparent that the invention applies to silicate ceramic articles in general since an important constituent of each is silica (or a silicate) which is the combined form of silicon with oxygen that is reduced to elemental silicon or forms a metal silicide in the process of this invention to form the desired conductive article. The presence of both of these constituents is indicated from X-ray studies. Since both silicon and silicide like magnesium silicide are electrically conductive, it has not been determined to what degree each contributes to the conductivity of the finished article.

Silicate ceramic articles contemplated include those ceramics, either amorphous or crystalline, in which silica constitutes a major component of the articles. These include feldspathic porcelain, steatites, glass, forsterites, stoneware, cordierite, zircon, lithia alumina silicates, and the like. The term glass is employed in its general meaning and includes such representative glasses as soda-lime, potash-lime, flint, borosilicate glasses, and fused silica.

According to the provisions of the patent statutes, I have explained the principle of the invention and have described what I consider to represent the best embodiment. However, I desire to have it understood that within the scope of the appended claims, the invention may be practiced otherwise than as specifically described.

I claim:

1. An electrically conductive ceramic article comprising (a) a normally non conductive silicate ceramic material and (b) particles of electrically conductive silicon and a silicide of a metal selected from the group consisting of beryllium, magnesium, calcium, barium, strontium, cerium, zirconium, thorium, and aluminum, wherein both silicon and silicide are uniformly distributed on the surface and also at least part way within said non-conductive material.

2. The article of claim 1 in which the material is soda-lime glass.

3. The article of claim 1 in which the material is fused silica.

4. The article of claim 1 in which the material is a feldspathic porcelain.

5. The article of claim 1 in which the material is a borosilicate glass.

6. The article of claim 1 in which the material is a zircon ceramic.

7. A high tension electrical insulator free from radio and corona interference comprising (a) a normally non-conductive silicate ceramic material and (b) particles of electrically conductive silicon and a silicide of a metal selected from the group consisting of beryllium, magnesium, calcium, barium, strontium, cerium, zirconium, thorium, and aluminum wherein both silicon and silicide are uniformly dispersed distributed on selected areas of the surface and also at least part way within said non-conductive material.

8. An electrically conductive ceramic article having a surface electrical resistance of one to five megohms per square centimeter and comprising (a) a normally non-conductive silicate ceramic material and (b) particles of electrically conductive silicon and aluminum silicide, wherein both silicon and silicide are uniformly distributed on the surface and also at least part way within said conductive material.

9. A method of producing electrically conductive ceramic articles comprising heating a silicate ceramic in contact with a heated metal selected from the group consisting of beryllium, magnesium, calcium, barium, strontium, cerium, zirconium, thorium, and aluminum, for a period of one to twelve hours in an inert atmosphere such that the ceramic is at a temperature of at least 700° F.

10. The method of claim 9 in which the silicate ceramic is glass and the metal is calcium.

11. The method of claim 10 in which the metal is magnesium.

12. The method of claim 9 in which the silicate ceramic is fused silica and the metal is barium.

13. The method of claim 12 in which the metal is magnesium.

14. The method of claim 9 in which the heating period is from one to three hours.

15. The method of claim 10 in which the metal is strontium.

16. The method of claim 9 in which the metal is in a molten state.

17. The method of claim 9 in which the metal is in a powered form.

18. The method of claim 9 in which both the metal and ceramic are in a liquid state.

19. The method of claim 9 in which the temperature ranges from 700–950° F.

References Cited in the file of this patent

UNITED STATES PATENTS

| | | |
|---|---|---|
| 2,118,795 | Littleton | May 24, 1938 |
| 2,684,297 | Urban | July 20, 1954 |
| 2,962,383 | Francl et al. | Nov. 29, 1960 |

FOREIGN PATENTS

| | | |
|---|---|---|
| 888,668 | Germany | Sept. 3, 1953 |